US009254660B2

(12) United States Patent
Mihara et al.

(10) Patent No.: US 9,254,660 B2
(45) Date of Patent: Feb. 9, 2016

(54) PROCESS FOR PRODUCING A LIQUID EJECTION HEAD

(71) Applicant: CANON KABUSHIKI KAISHA, Tokyo (JP)

(72) Inventors: Hiroaki Mihara, Machida (JP); Etsuko Sawada, Tokyo (JP); Shoji Shiba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/467,383

(22) Filed: Aug. 25, 2014

(65) Prior Publication Data

US 2015/0060398 A1 Mar. 5, 2015

(30) Foreign Application Priority Data

Sep. 2, 2013 (JP) ................................ 2013-181149

(51) Int. Cl.
*G01D 15/18* (2006.01)
*B41J 2/16* (2006.01)

(52) U.S. Cl.
CPC .............. *B41J 2/1629* (2013.01); *B41J 2/1603* (2013.01); *B41J 2/1628* (2013.01); *B41J 2/1631* (2013.01); *B41J 2/1639* (2013.01); *B41J 2/1645* (2013.01)

(58) Field of Classification Search
CPC ...... B41J 2/1603; B41J 2/1628; B41J 2/1629; B41J 2/14; B41J 2/14314; B41J 2202/03
USPC .................. 216/2, 27, 52; 347/47, 54, 56, 65
See application file for complete search history.

(56) References Cited

U.S. PATENT DOCUMENTS

| | | | | | |
|---|---|---|---|---|---|
| 4,565,859 | A | | 1/1986 | Murai et al. | |
| 4,841,017 | A | | 6/1989 | Murai et al. | |
| 5,478,606 | A | | 12/1995 | Ohkuma et al. | |
| 6,008,282 | A | * | 12/1999 | Wang et al. | 524/398 |
| 2006/0012051 | A1 | * | 1/2006 | Sato et al. | 257/777 |
| 2009/0136875 | A1 | | 5/2009 | Kubota et al. | |
| 2010/0020131 | A1 | * | 1/2010 | Nishi | 347/68 |
| 2012/0120155 | A1 | * | 5/2012 | Fukumoto | 347/47 |
| 2013/0265368 | A1 | * | 10/2013 | Kubota et al. | 347/54 |

FOREIGN PATENT DOCUMENTS

| | | | |
|---|---|---|---|
| JP | 60-161973 | A | 8/1985 |
| JP | 63-221121 | A | 9/1988 |
| JP | 64-9216 | A | 1/1989 |
| JP | 2-140219 | A | 5/1990 |
| JP | 6-286149 | A | 10/1994 |
| JP | 2009-119725 | A | 6/2009 |

* cited by examiner

*Primary Examiner* — Nadine Norton
*Assistant Examiner* — Maki Angadi
(74) *Attorney, Agent, or Firm* — Fitzpatrick, Cella, Harper & Scinto

(57) ABSTRACT

A process for producing a liquid ejection head including a silicon substrate having a supply port to supply a liquid to a flow path, and an ejection-orifice-forming member forming the flow path between the ejection-orifice-forming member and the silicon substrate and having an ejection orifice to eject the liquid in the flow path. The process includes forming an etching protection film so as to cover the ejection-orifice-forming member; forming the supply port passing through the silicon substrate by anisotropic etching using an alkaline aqueous solution; and removing the etching protection film. The etching protection film includes an organic polymer material having a storage modulus at 80° C. of $1.0\times10^6$ Pa or higher.

10 Claims, 3 Drawing Sheets

PROCESS FOR PRODUCING A LIQUID EJECTION HEAD

BACKGROUND OF THE INVENTION

1. Field of the Invention

The present invention relates to a process for producing a liquid ejection head.

2. Description of the Related Art

An ink jet recording head applied to an ink jet recording system generally has an ink flow path, an energy-generating section installed in a part of the ink flow path, and a minute ink ejection orifice to eject an ink. As a process for producing such an ink jet recording head, Japanese Patent Application Laid-Open No. H06-286149 discloses a process in which a mold of an ink flow path is patterned with a photosensitive resin material on a substrate on which an electrothermal conversion element serving as an energy-generating element is formed; a coating resin layer to form the ink flow path on the substrate is applied and formed so as to coat the mold pattern; an ink ejection orifice to communicate with the mold of the ink flow path is formed on the coating resin layer; and then the photosensitive material used for the mold is removed.

The ink jet recording head produced by the above process is a so-called side shooter-type ink jet recording head in which the growth direction of a bubble to be the ejection energy is the same as the ejection direction of an ink. In the side shooter-type ink jet recording head, since an ink supply port passing through the substrate needs to be formed in order to supply the ink to the ink flow path, the ink supply port is formed by sandblast processing in Japanese Patent Application Laid-Open No. H06-286149. Japanese Patent Application Laid-Open No. 2009-119725 discloses mechanical processing using a drill, processing using a light energy such as laser light and a processing method using chemical etching. Further, a method of forming an ink supply port from the back surface of a silicon substrate by a chemical etching (anisotropic etching) using tetramethylammonium hydride (TMAH) is exemplified.

In the case where an ink supply port is formed from the back surface of a substrate by anisotropic etching, in order to protect an ejection-orifice-forming member already formed on the surface of the substrate from erosion by an etchant, a process of coating the ejection-orifice-forming member with a protection film material can be mentioned. Japanese Patent Application Laid-Open No. 2009-119725 discloses a process of using a resin material composed of a cyclized isoprene as a protection film material.

SUMMARY OF THE INVENTION

The process for producing a liquid ejection head according to the present invention is a process for producing a liquid ejection head which includes a silicon substrate having a supply port to supply a liquid to a flow path, and an ejection-orifice-forming member forming the flow path between the ejection-orifice-forming member and the silicon substrate and having an ejection orifice to eject the liquid in the flow path; the process including forming an etching protection film so as to cover the ejection-orifice-forming member, forming the supply port passing through the silicon substrate by anisotropic etching using an alkaline aqueous solution, and removing the etching protection film, wherein the etching protection film contains an organic polymer material having a storage modulus at 80° C. of $1.0\times10^6$ Pa or higher.

Further features of the present invention will become apparent from the following description of exemplary embodiments with reference to the attached drawings.

DESCRIPTION OF THE EMBODIMENTS

Figure 1:
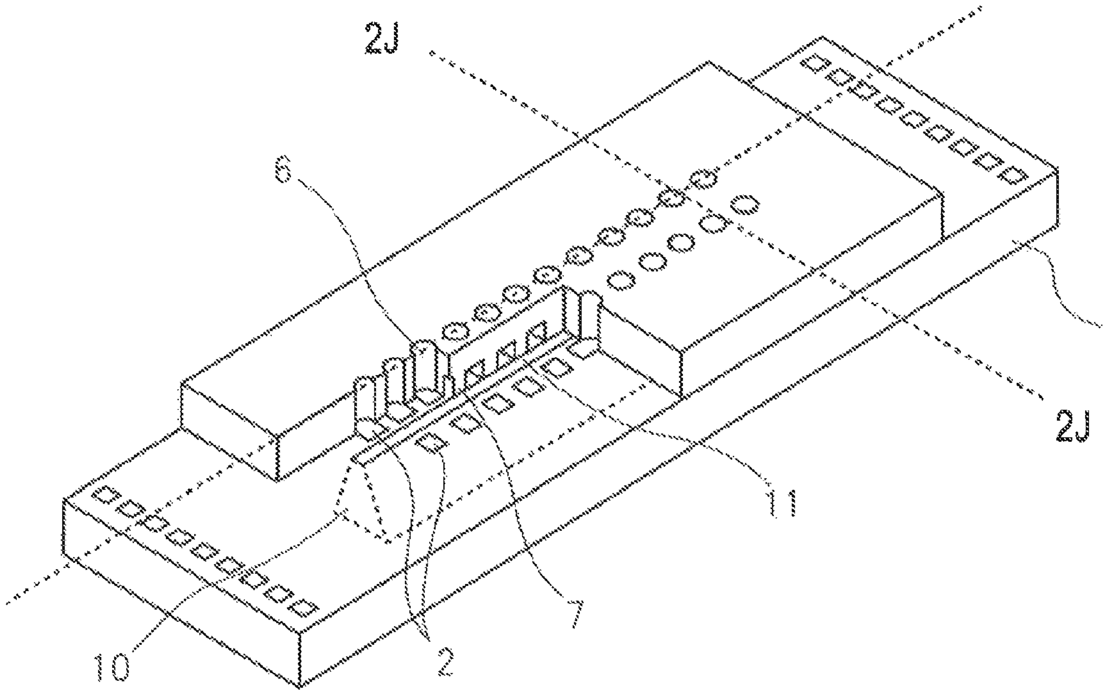
FIG. 1 is a perspective view illustrating a structure of an example of a liquid ejection head produced by the process according to the present invention.

Preferred Embodiments of the Present Invention will now be described in detail in accordance with the accompanying drawings.

In the case where a protection film material is coated on an ejection-orifice-forming member, it is necessary that the protection film material is gaplessly filled in an ejection orifice and gaplessly adheres with the ejection-orifice-forming member. Since the anisotropic etching is generally carried out under heating of about 40 to 90° C., for example, in the case where a protection film material described in Japanese Patent Application Laid-Open No. 2009-119725 is used, and if a bubble is present between the protection film material and the ejection-orifice-forming member, the bubble expands during the etching. The protection film is thereby damaged and pinholes are generated, and the ejection-orifice-forming member is thereby eroded with an etchant in some cases. In the case where the ejection-orifice-forming member contacts with a high-temperature alkali etchant, the wettability of an ink partly changes and the ejection performance of the ink decreases in some cases. Particularly in a liquid ejection head in which the surface of an ejection-orifice-forming member has been subjected to a water-repellent treatment, since the water repellent performance is lost due to an alkali etchant, such a defect as dot misalignment in liquid ejection direction and liquid ejection failure is caused in some cases.

The present invention has an object to provide a liquid ejection head causing neither dot misalignment in liquid ejection direction nor liquid ejection failure.

The process for producing a liquid ejection head according to the present invention is a process for producing a liquid ejection head which includes a silicon substrate having a supply port to supply a liquid to a flow path, and an ejection-orifice-forming member forming the flow path between the ejection-orifice-forming member and the silicon substrate and having an ejection orifice to eject the liquid in the flow path; the process including forming an etching protection film so as to cover the ejection-orifice-forming member, forming the supply port passing through the silicon substrate by anisotropic etching using an alkaline aqueous solution, and removing the etching protection film, wherein the etching protection film contains an organic polymer material having a storage modulus at 80° C. of $1.0\times10^6$ Pa or higher.

In the present invention, as the etching protection film, a film which contains an organic polymer material having a storage modulus at 80° C. of $1.0\times10^6$ Pa or higher is used. The etching protection film thereby has a sufficient strength even when a supply port is formed in a silicon substrate by anisotropic etching using an alkaline aqueous solution at about 80° C. Therefore, even in the case where a bubble is present between the ejection-orifice-forming member and the etching protection film, damage to the etching protection film due to the expansion of the bubble can be prevented and the ejection-orifice-forming member can sufficiently be protected by the etching protection film. Therefore, the process according to the present invention can provide a liquid ejection head which does not cause such a defect as dot misalignment in liquid ejection direction and liquid ejection failure. Hereinafter, the present invention will be described in more detail by reference to drawings.

FIG. 1 is a perspective view schematically illustrating a structure of an example of a liquid ejection head produced by the process according to the present invention. A liquid ejection head illustrated in FIG. 1 has a silicon substrate 1 having a plurality of energy-generating elements 2 arranged in two rows. An ejection-orifice-forming member 7 forming a flow path 11 between the ejection-orifice-forming member 7 and the silicon substrate 1 and ejection orifices 6 at positions corresponding to the energy-generating elements 2 is formed on the silicon substrate 1. A supply port 10 passing through the silicon substrate 1 is formed in the silicon substrate 1. A liquid supplied to the flow path 11 through the supply port 10 is ejected from the ejection orifices 6 by energy generated by the energy-generating elements 2.

Hereinafter, details of each step of an example of the process according to the present invention will be described by using FIGS. 2A to 2J. Here, FIGS. 2A to 2J are cross-sectional views in respective steps cut on line 2J-2J of the liquid ejection head illustrated in FIG. 1. The present invention is not limited to the process illustrated in FIGS. 2A to 2J.

1. Preparation of a Silicon Substrate 1 (FIG. 2A)

Figure 2A:
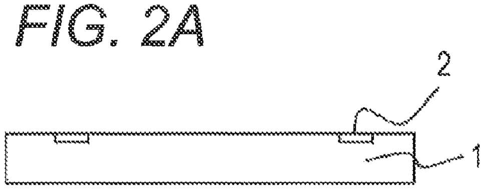
FIGS. 2A, 2B, 2C, 2D, 2E, 2F, 2G, 2H, 2I and 2J are cross-sectional views illustrating each step of an example of the process according to the present invention.

First, as illustrated in FIG. 2A, a silicon substrate 1 is prepared. The silicon substrate 1 is not especially limited as long as it is a silicon substrate capable of being subjected to anisotropic etching using an alkaline aqueous solution, but for example, a silicon substrate having a crystal orientation of <100> can be used.

On the silicon substrate 1, a desired number of energy-generating elements 2 such as electrothermal conversion elements or piezoelectric elements can be arranged. The energy-generating elements 2 impart ejection energy to eject liquid droplets to a liquid to thereby carry out recording. For example, in the case of using an electrothermal conversion element as the energy-generating element 2, the electrothermal conversion element heats the liquid in the vicinity thereof to thereby cause a state change on the liquid and generate ejection energy. For example, in the case of using a piezoelectric element as the energy-generating element 2, the mechanical vibration of the piezoelectric element generates ejection energy.

To the energy-generating element 2, a control-signal-input electrode (not illustrated in the figure) to operate the energy-generating element 2 is connected. On the silicon substrate 1, various types of function layers, such as a protection layer (not illustrated in the figure) for the purpose of improvement in the durability of the energy-generating element 2 and an adhesion improving layer (not illustrated in the figure) for the purpose of improvement in the adhesiveness between an ejection-orifice-forming member described later and the silicon substrate 1, can be provided.

2. Formation of a Mold Material 4 (FIGS. 2B and 2C)

Figure 2B:
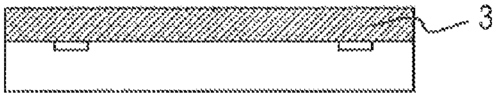

Then, as illustrated in FIG. 2B, a positive resist layer 3 is formed on the silicon substrate 1. The positive resist layer 3 is required to have resistance to an application solvent used in formation of a resin layer described later. Then, as the material of the positive resist layer 3, a main chain decomposition type positive resist of a polymer containing a methacrylate ester excellent in solvent resistance as a main component or a main chain decomposition type positive resist containing a polymethyl isopropenyl ketone as a main component can be used.

Examples of the main chain decomposition type positive resist of a polymer containing a methacrylate ester as a main component include homopolymers such as polymethyl methacrylate and polyethyl methacrylate, and copolymers of methyl methacrylate with methacrylic acid, acrylic acid, glycidyl methacrylate, phenyl methacrylate or the like. As the material of the positive resist layer 3, use of a polymethyl isopropenyl ketone is more preferable from the viewpoint of being comprehensively excellent in properties such as sensitivity, resolution and solvent resistance. These materials for the positive resist layer 3 may be used alone or two or more materials may be used in combination. The thickness of the positive resist layer 3 is not especially limited, but can be made to be, for example, 5 to 70 μm.

Figure 2C:
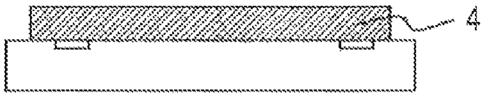

Then, as illustrated in FIG. 2C, the positive resist layer 3 is patterned by general photolithography techniques to thereby form a mold material 4 being a mold of the flow path. For example, the positive resist layer 3 is exposed through a mask from the above thereof, and developed to thereby form the mold material 4.

3. Formation of an Ejection-Orifice-Forming Member 7 (FIGS. 2D and 2E)

Figure 2D:
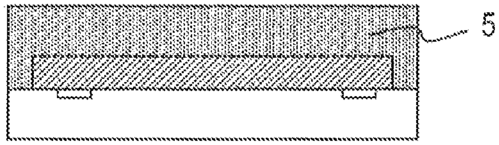
Figure 2E:
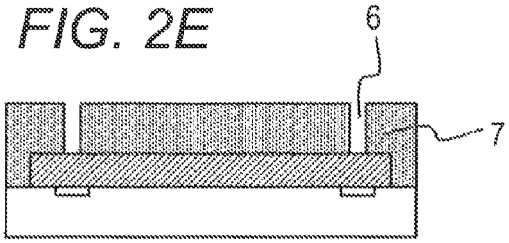

Then, as illustrated in FIG. 2D, coating of a resin layer 5 serving as an ejection-orifice-forming member is applied on the mold material 4. Since the ejection-orifice-forming member functions as a constituting member of flow paths and ejection orifices, the material of the resin layer 5 is required to have a high mechanical strength, adhesiveness with the silicon substrate 1, ink resistance, resolution for patterning of a minute pattern of the ejection orifices, and the like. As the material of the resin layer 5, a cationically polymerizable epoxy resin composition satisfying these properties can be used.

Examples of epoxy resins contained in the epoxy resin composition include reaction products of bisphenol A and epichlorohydrin (having a molecular weight of 900 or higher), reaction products of bromine-containing bisphenol A and epichlorohydrin, reaction products of a phenol novolac or o-cresol novolac and epichlorohydrin, and polyfunctional epoxy resins having an oxycyclohexane skeleton, described in Japanese Patent Application Laid-Open No. S60-161973 and Japanese Patent Application Laid-Open No. S63-221121 and Japanese Patent Application Laid-Open No. S64-9216 and Japanese Patent Application Laid-Open No. H02-140219 and the like. These may be used alone or two or more of them may be used in combination. The epoxy equivalent of the epoxy resin is preferably 2,000 or lower, and more preferably 1,000 or lower. The epoxy equivalent being 2,000 or lower improves the crosslinking density in curing reaction, and the adhesiveness and the ink resistance. The epoxy equivalent is a value measured by the measurement method prescribed in JIS K 7236:20091.

As a cationic photopolymerization initiator to cure the epoxy resin contained in the epoxy resin composition, a compound to generate an acid by light irradiation can be used. As the compound to generate an acid by light irradiation, for example, aromatic sulfonium salts and aromatic iodonium salts can be used. As commercially available products of the aromatic sulfonium salts, for example, TPS-102, 103, 105, MDS-103, 105, 205, 305, DTS-102, 103 (hitherto trade names, made by Midori Kagaku Co., Ltd.), and SP-170, 172 (hitherto trade names, made by Adeka Corp.) can be used. As commercially available products of the aromatic iodonium salts, for example, DPI-105, MPI-103, 105, BBI-101, 102, 103, 105 (hitherto trade names, made by Midori Kagaku Co., Ltd.) can be used. These may be used alone or two or more of them may be used in combination. The content of the cationic photopolymerization initiator can be an arbitrary amount selected so as to provide a target sensitivity, but can be 0.5 to 5% by mass with respect to the epoxy resin.

If necessary, for example, SP-100 (trade name, made by Adeka Corp.) may be used together as a wavelength sensitizer. Other additives can further be added appropriately to the epoxy resin composition, if necessary. For example, a flexibility imparting agent may be added for the purpose of reducing the elastic modulus of the epoxy resin, and a silane coupling agent may be added for the purpose of providing a higher adhesive force with the silicon substrate 1. The resin layer 5 can be formed, for example, by applying a material of the resin layer 5 so as to cover the mold material 4 by a method such as a spin coating method, a roll coating method or a slit coating method.

Then, if necessary, a liquid-repellent layer (not illustrated in the figure) is formed on the resin layer 5. Although a liquid-repellent layer can be formed by a spin coating method, a roll coating method, a slit coating method or the like, since a liquid-repellent layer is formed on an uncured resin layer 5 in the present embodiment, it is preferable that the both layers do not have a compatibility more than necessary.

Then, as illustrated in FIG. 2E, the resin layer 5 is patterned by the usual photolithography technique to thereby form ejection orifices 6 and obtain the ejection-orifice-forming member 7. The ejection orifices 6 can be formed, for example, by exposing the resin layer 5 from the above through a mask and developing the resin layer 5. Thereafter, a heat treatment may be carried out as required to thereby promote the curing reaction of the ejection-orifice-forming member 7.

4. Formation of a Supply Port 10 (FIGS. 2F, 2G and 2H)

Figure 2F:
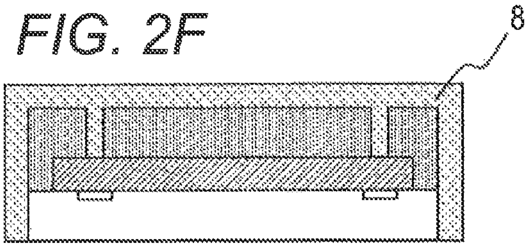
Figure 2G:
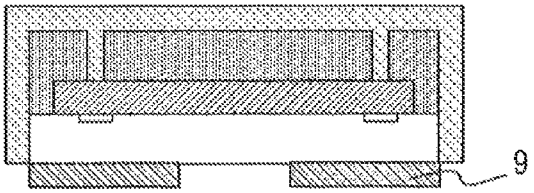
Figure 2H:
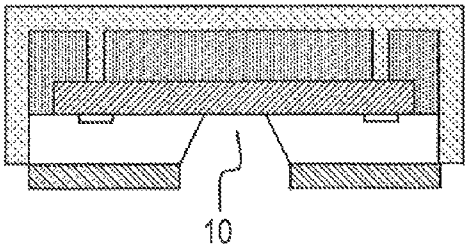
Figure 3A:
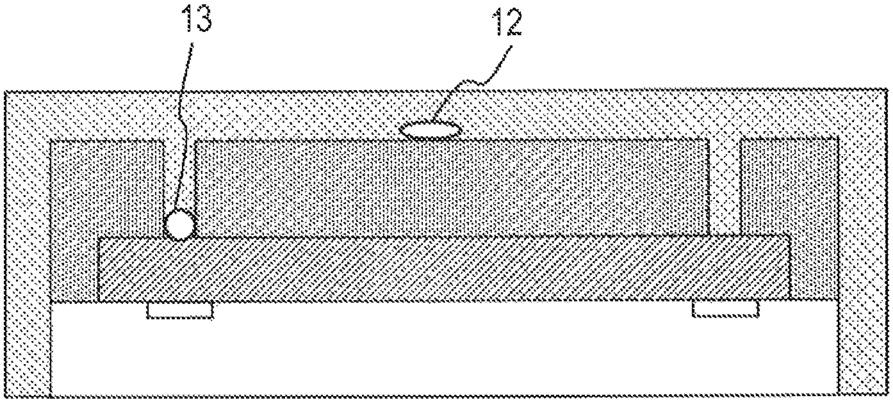
FIGS. 3A and 3B are cross-sectional views illustrating remaining of a bubble and damage to an etching protection film due to the bubble.

Then, as illustrated in FIG. 2F, an etching protection film 8 having resistance to an etchant is formed so as to cover the ejection-orifice-forming member 7. The etching protection film 8 can be formed, for example, by dissolving a material having resistance to the etchant in a proper solvent, applying the solution by a spin coating method, a slit coating method, a curtain coating method, a dip coating method or the like, and removing the solvent by baking. At this time, as illustrated in FIG. 3A, there are some cases where at the interfaces between the etching protection film 8 and the ejection-orifice-forming member 7 or the mold material 4, bubbles (bubble-1 (bubble 12) and bubble-2 (bubble 13)) are included. Particularly in the ejection-orifice-forming member 7, since recesses like the ejection orifices 6 are present, the bubble (bubble-2 (bubble 13)) is highly possibly included in the case where the etching protection film 8 is not sufficiently filled in the interior of the recesses.

Figure 3B:
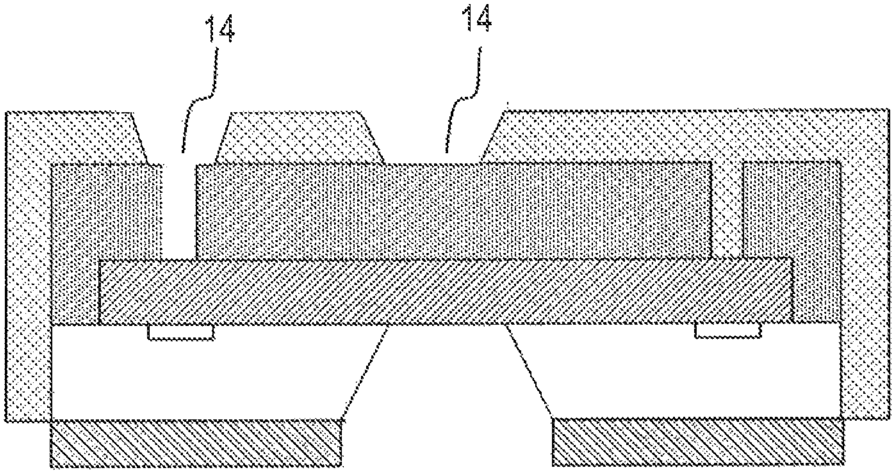

If anisotropic etching is carried out with a bubble included in the interior, the bubble expands by heat and damage is caused to the etching protection film 8 as illustrated in FIG. 3B to thereby generate pin holes 14 in some cases. If the anisotropic etching is continued in the state where the etching protection film 8 is damaged, the ejection-orifice-forming member 7 is eroded with the etchant, and such a defect as dot misalignment in liquid ejection direction and liquid ejection failure is caused in some cases. From the viewpoint of avoiding occurrence of the defect, the etching protection film 8 is demanded to have the following property (1).

(1) Having a film strength enough not to lead to damage, even in the case where a bubble expands.

From the similar viewpoint, the etching protection film 8 can have the following properties (2) to (4).

(2) Having a sufficient resistance to an alkaline etchant.

(3) Having adhesiveness with the silicon substrate 1 and the ejection-orifice-forming member 7.

(4) Having a thickness enough not to cause pin holes.

Further, since the etching protection film 8 needs to be removed in a step described later, the etching protection film 8 can have the following property (5).

(5) Being able to be easily dissolved and removed by a solvent.

Hereinafter, the respective properties of (1) to (5) will be described in more detail.

(1) Having a Film Strength Enough not to Lead to Damage, Even in the Case where a Bubble Expands.

The physical property value of the etching protection film 8 necessary for resisting to a pressure by the expansion of the bubble can be defined with elastic modulus. In general organic polymer materials, the elastic modulus decreases with the rise of the temperature. That is, since the etching protection film 8 comes to lose resistance to a pressure resulted from the expansion of the bubble under heating to be thereby led to damage, so use of an etching protection film 8 having a sufficient elastic modulus even under heating is effective for prevention of the damage. As a result of exhaustive studies, the present inventors have found that in the case where anisotropic etching is carried out at about 80° C., the use of an organic polymer material having a storage modulus at 80° C. of $1.0\times10^6$ Pa or higher as the material of the etching protection film 8 can sufficiently prevent the damage. Here, about 80° C. represents, for example, 75 to 90° C. The storage modulus is preferably $1.5\times10^6$ Pa or higher, more preferably $2.0\times10^6$ Pa or higher, and still more preferably $3.0\times10^6$ Pa or higher. Further the storage modulus is preferably $9.0\times10^6$ Pa or lower, and more preferably 8.0 Pa or lower, from the viewpoint of preventing warpage of the silicon substrate 1 caused by the stress of the etching protection film 8 and enabling stable etching. The storage modulus at 80° C. is a value measured by a dynamic viscoelasticity measuring apparatus (1 Hz) (product name: EXSTAR6000, made by Seiko Instruments Inc.).

(2) Having a Sufficient Resistance to an Alkaline Etchant

Since an alkaline aqueous solution is used for the anisotropic etching of the silicon substrate 1, it is preferable that the etching protection film 8 does not dissolve in the alkaline aqueous solution. That is, it is preferable that the organic polymer material does not have a polar group such as a hydroxyl group. Further since the etching protection film 8 needs to have alkali resistance, the organic polymer material can be a material causing no chemical change by alkali.

(3) Having Adhesiveness with the Silicon Substrate 1 or with the Ejection-Orifice-Forming Member 7

If the etching protection film 8 exfoliates from the silicon substrate 1 or from the ejection-orifice-forming member 7 during the anisotropic etching, the erosion by an etchant progresses from the exfoliation interface. From the viewpoint of preventing the exfoliation, the etching protection film 8 can have an adhesiveness in some degree with the silicon substrate 1 or with the ejection-orifice-forming member 7. In order to secure the adhesiveness, the organic polymer material can have, in the structure thereof, aprotic polar groups such as a benzene ring, a carbonyl group and a nitrile group.

(4) Having a Thickness Enough not to Cause Pin Holes.

As illustrated in FIG. 3A, the bubble-1 (bubble 12) entrapped at the interface between the etching protection film 8 and the ejection-orifice-forming member 7 during the formation of the etching protection film 8 disappears during baking in almost all cases. That is, although the bubble expands by the heat during baking to temporarily cause pin holes, the organic polymer material flows during baking to thereby close the pin holes. However, the bubble-2 (bubble 13) entrapped in the interior of the ejection orifice 6 is included as it is in some cases. In order to prevent the bubble from damaging the etching protection film 8 during the anisotropic etching, in addition to the above (1) to (3), the thickness of the etching protection film 8 can be equal to or larger than the diameter of the ejection orifice 6. In consideration that for example, the minimum diameter of ejection orifices of an ink jet recording head installed in an ink jet recording apparatus presently commercially available is about 8 to 10 μm, the thickness of the etching protection film 8 is preferably 10 μm or larger, and more preferably 15 μm or larger. The diameter of an ejection orifice represents a maximum length across the cross-section of the ejection orifice.

(5) Being Able to be Easily Dissolved and Removed by a Solvent.

The etching protection film 8 is removed in a step described later, and from the viewpoint of easiness of removal of the etching protection film 8, the etching protection film 8 is preferably an etching protection film 8 which can easily be dissolved and removed by a solvent. In order not to reduce the intrinsic solubility of the organic polymer material, it is preferable that the organic polymer material cause no intermolecular crosslinking and deterioration such as polarity change during the baking or the anisotropic etching during the formation of the etching protection film 8. From this viewpoint, the organic polymer material preferably has no substituent easily reacting by heat or alkali. Even if the intermolecular crosslinking and the deterioration occur and the solubility decreases, the etching protection film 8 can be used without any particular problem as long as it is easily decomposed to decrease the low-molecular weight by a treatment such as light irradiation. As the organic polymer material satisfying these properties, an acryl-based organic polymer material generating a photodegradation reaction of a so-called Norrish type can be used. Further even in the case where the organic polymer material whose intrinsic solubility is not decreased, the solubility can be largely improved as compared with the initial solubility by decomposition by light irradiation. However, in the case where the thickness of the etching protection film 8 is extremely large, since light hardly reaches the bottom of the etching protection film 8, the thickness of the etching protection film 8 is preferably 80 μm or smaller, and more preferably 50 μm or smaller.

Upon exhaustive studies, the present inventors have found that as the material satisfying all the requirements of the above (1) to (5), a copolymer of a monomer mixture containing styrene and acrylonitrile is useful. By using the copolymer as the organic polymer material, sufficient film strength, resistance to an etchant, and adhesiveness with the silicon substrate 1 can be provided. The proportion of a styrene unit in the copolymer is preferably 50 to 80% by mol, and more preferably 55 to 75% by mol. Making the proportion to be 50% by mol or higher improves the film strength of the etching protection film 8. Further making the proportion to be 80% by mol or lower improves the adhesiveness with the silicon substrate 1. The proportion is a value calculated from a monomer composition ratio in the monomer mixture, and the total of the whole monomers in the monomer mixture is taken to be 100% by mol. Further from the viewpoint of the solubility to a solvent and the removability of the etching protection film 8, the mass-average molecular weight (Mw) of the copolymer is preferably 50,000 to 400,000, and more preferably 80,000 to 300,000. The mass-average molecular weight is a value measured by a GPC measuring apparatus (made by Shimadzu Corp.).

As described above, although the thickness of the etching protection film 8 can be equal to or larger than the diameter of the ejection orifice 6, if the thickness becomes large, the removal of the etching protection film 8 takes much time in some cases. Therefore, the monomer mixture can further contain, in addition to styrene and acrylonitrile, a photodegradable monomer. The photodegradable monomer includes monomers to become main chain-decomposition-type polymer materials, such as vinyl ketones, acrylate esters and methacrylate esters. For example, the monomer mixture can contain at least one of the compounds represented by the following formulae (1) and (2).

[Formula 1]

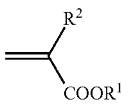

(1)

(In the formula (1), $R^1$ is an alkyl group; and $R^2$ is hydrogen or an alkyl group.)

[Formula 2]

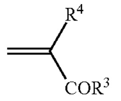

(2)

(In the formula (2), $R^3$ and $R^4$ are each hydrogen or an alkyl group). $R^1$ of the above formula (1) can be an alkyl group having 1 to 5 carbon atoms. The alkyl group of $R^2$ can be an alkyl group having 1 to 5 carbon atoms. The alkyl group of $R^3$ of the above formula (2) can be an alkyl group having 1 to 5 carbon atoms. The alkyl group of $R^4$ can be an alkyl group having 1 to 5 carbon atoms. The compound represented by the above formula (1) specifically includes methyl isopropenyl ketone and ethyl isopropenyl ketone. The compound represented by the above formula (2) specifically includes methyl methacrylate, ethyl methacrylate, methyl acrylate and ethyl acrylate. These may be used alone or two or more of them may be used in combination.

The proportion of the photodegradable monomer unit in the copolymer is preferably 1 to 20% by mol, and more preferably 5 to 10% by mol. The removal time of the etching protection film 8 can be shortened by making the proportion to be 1% by mol or higher. Since a polymer having an ester structure in the molecule has slightly lower alkali resistance than a copolymer including styrene and acrylonitrile, the proportion of the polymer can be 20% by mol or lower. The proportion is a value calculated from a monomer composition ratio in a monomer mixture, and the total of the whole monomers in the monomer mixture is taken to be 100% by mol.

Then, as illustrated in FIG. 2G, an etching mask 9 is formed on the back surface of the silicon substrate 1. As the material of the etching mask 9, resist materials, inorganic materials and the like having resistance to an alkaline aqueous solution being an etchant can be used. The etching mask 9 can be formed by patterning the material by a usual photolithography technique. The etching mask 9 can be formed, for example, by forming a film of the material on the back surface of the silicon substrate 1, and thereafter exposing the film from the above through a mask, and developing the film. The etching mask 9 may be formed in advance in a step before this step.

Then, as illustrated in FIG. 2H, a supply port 10 passing through the silicon substrate 1 is formed by anisotropic etching using an alkaline aqueous solution. The alkaline aqueous solution used for the formation of the supply port 10 includes aqueous solutions of potassium hydroxide, sodium hydroxide, tetramethylammonium hydroxide and the like. These may be used alone or two or more of them may be used in combination. By immersing the silicon substrate 1 in these alkaline aqueous solutions, a portion of the silicon substrate 1 on the back surface where the etching mask 9 is not formed is etched to thereby form the supply port 10. A silicon substrate having the <100> crystal orientation and a silicon substrate having the <110> crystal orientation have the selectivity concerning the etching advancing direction for the depth direction and the width direction in conducting alkali-based chemical etching, and the etching anisotropy can thereby be acquired. Particularly in a silicon substrate having the <100> crystal orientation, since the depth to be etched is geometrically determined by a width to be etched, the etching depth can be controlled. For example, a hole narrowing with a inclination of 54.7° in the depth direction from the etching starting surface can be formed with a good accuracy. Here, the kind, the concentration, the treatment temperature and the treatment time of an alkaline aqueous solution can arbitrary be set so as to obtain a desired etching rate depending on the thickness of the silicon substrate 1 to be used, the opening width of the supply port 10 and the like.

5. Formation of a Flow Path 11 (FIGS. 2I and 2J)

Figure 2I:
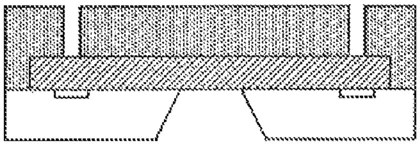

Then, as illustrated in FIG. 2I, the etching protection film 8 and the etching mask 9 are removed. The etching protection film 8 can be dissolved and removed using a proper solvent. For example, in the case where a copolymer of a monomer mixture containing styrene and acrylonitrile is used as the organic polymer material being a material of the etching protection film 8, methyl isoamyl ketone, limonene or the like can be used as the solvent. These may be used alone or two or more of them may be used in combination. For the purpose of improving the solubility of the etching protection film 8, the etching protection film 8 may be irradiated with Deep-UV light, and thereafter dissolved and removed. The etching protection film 8 and the etching mask 9 may be dissolved and removed simultaneously.

Figure 2J:
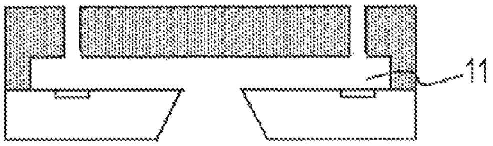

Then, as illustrated in FIG. 2J, a flow path 11 is formed by removing the mold material 4. The mold material 4 can be dissolved and removed using a proper solvent. The etching protection film 8, the etching mask 9 and the mold material 4 may be dissolved and removed simultaneously.

Thereafter, the silicon substrate 1 is subjected to a cutting and separation step (not illustrated in the figure), and as required subjected to a heating treatment to thereby completely cure the ejection-orifice-forming member 7. Joining of members (not illustrated in the figure) to supply the liquid, electric joining (not illustrated in the figure) to drive the energy-generating element 2 and the like are further carried out to thereby complete a liquid ejection head.

The above process can produce a liquid ejection head without causing expansion of a bubble nor causing damage to the protection film even in the case where the bubble is present between the ejection-orifice-forming member and the etching protection film in forming the supply port by the anisotropic etching. The liquid ejection head does not cause such a defect as dot misalignment in liquid ejection direction and liquid ejection failure. The liquid ejection head produced by the process according to the present invention can be used suitably as ink jet recording heads, 3D printer heads and the like carrying out printing by ejecting ink.

EXAMPLES

Hereinafter, Examples of the present invention will be described, but the present invention is not limited thereto. Evaluations were carried out by the following methods.

Removability

After the etching protection film was removed, the contact angle of the liquid-repellent layer surface of the sample was measured, and the removability of the etching protection film was evaluated according to the following criteria.

AA: the evaporation retreat contact angle in pure water was 80° or larger.

A: the evaporation retreat contact angle in pure water was 70° or larger and smaller than 80°.

B: the evaporation retreat contact angle in pure water was smaller than 70°.

Appearance after Etching 100 ink jet recording heads were fabricated by the processes of Examples and Comparative Examples, and the appearances of the etching protection films after the anisotropic etching at that time were checked, and evaluated according to the following criteria.

A: all the 100 ink jet recording heads fabricated generated neither crack nor pin hole.

B: cracks were generated on a surface of the etching protection film in some of the heads.

C: pin holes were generated in the etching protection film in some of the heads.

Printing 100 ink jet recording heads were fabricated by the processes of Examples and Comparative Examples, and evaluations of the printing were carried out according to the following criteria.

A: all the 100 ink jet recording heads fabricated could carry out printing well.

C: dot misalignment in the ejection direction of the ink or ejection failure of the ink was caused in the printing in some of the heads.

Example 1

Preparation of an Etching Protection Film Material

A copolymer of styrene and acrylonitrile was used as an etching protection film material. The monomer composition ratio (molar ratio) of styrene and acrylonitrile was 5:2, and the mass-average molecular weight (Mw) of the copolymer was 120,000. A mixed solvent of propylene glycol methyl ether acetate (PGMEA) and ethyl acetoacetate was used as an application solvent. The mixing ratio (mass ratio) of PGMEA and ethyl acetoacetate was 2:1. A solution in which the etching protection film material was dissolved in the application solvent was prepared. The solid content concentration of the solution was made to be 20% by mass. The solution was dropped on an 8-inch wafer, and thereafter applied by a spin coating method at 450 rpm for 30 sec. The coated wafer was baked at 40° C. for 10 min, and further at 140° C. for 5 min to thereby fabricate a film of 30 μm in thickness. The storage modulus of this film was measured by a dynamic viscoelasticity measuring apparatus (1 Hz) (product name:

EXSTAR6000, made by Seiko Instruments Inc.), and the storage modulus at 80° C. was $3.0\times10^6$ Pa.

Fabrication of an Ink Jet Recording Head

As illustrated in FIG. 2A, an 8-inch silicon substrate 1 having energy-generating elements 2 and having the <100> crystal orientation was prepared. Then, as illustrated in FIG. 2B, a solution in which methyl isopropenyl ketone was dissolved in ethyl acetoacetate as a solvent was applied on the silicon substrate by a spin coating method, and dried to thereby form a positive resist layer 3. Then, as illustrated in FIG. 2C, the positive resist layer 3 was patterned by a photolithography technique to thereby form a mold material 4. Then, as illustrated in FIG. 2D, a solution in which EHPE (trade name, made by Daicel Corp.) and SP-172 (trade name: made by Adeka Corp.) were dissolved in xylene as a solvent was applied on the mold material 4 by a spin coating method, and dried to thereby form a resin layer 5. Then, as illustrated in FIG. 2E, the resin layer 5 was patterned by a photolithography technique to form ejection orifices 6 whose cross-section was circular to thereby obtain an ejection-orifice-forming member 7.

Then, as illustrated in FIG. 2F, an etching protection film 8 was formed on the ejection-orifice-forming member 7. Specifically, a solution in which the etching protection film material was dissolved in the application solvent was dropped on the ejection-orifice-forming member 7, and thereafter applied by a spin coating method at 450 rpm for 30 sec. This was baked at 40° C. for 10 min, and further at 140° C. for 5 min to thereby form an etching protection film 8 of 30 μm in thickness. Then, as illustrated in FIG. 2G, a polyetheramide (trade name: HIMAL, made by Hitachi Chemical Co., Ltd.) was applied on the back surface of the silicon substrate 1 by a spin coating method, dried, and thereafter patterned by a photolithography technique to thereby form an etching mask 9. Then, as illustrated in FIG. 2H, the silicon substrate 1 was immersed in a 20-mass % tetramethylammonium hydroxide aqueous solution controlled at 80 to 83° C., and held for 15 hours to thereby form a supply port 10 passing through the silicon substrate 1.

Then, the surface of the etching protection film was immersed in methyl isoamyl ketone followed by a shower of methyl isoamyl ketone. This process was repeated three times to thereby remove the etching protection film 8. Further, the silicon substrate 1 was subjected to a dry etching treatment to remove the etching mask 9 to thereby obtain a state illustrated in FIG. 2I. Then, as illustrated in FIG. 2J, the silicon substrate 1 was immersed in ethyl lactate to remove the mold material 4 and form a flow path 11 to thereby complete an ink jet recording head. The diameter of the ejection orifices 6 of the ink jet recording head fabricated in the present Example was 15 μm. The evaluation results are shown in Table 1.

Example 2

Preparation of an Etching Protection Film Material

A copolymer of styrene, acrylonitrile and methyl isopropenyl ketone (MIPK) was used as an etching protection film material. The monomer composition ratio (molar ratio) of styrene, acrylonitrile and MIPK was 13:6:1, and the mass-average molecular weight (Mw) of the copolymer was 150,000. An application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 500 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $2.0\times10^6$ Pa.

Fabrication of an Ink Jet Recording Head

The steps until the step of forming an ejection-orifice-forming member 7 were carried out as in Example 1. Then, as illustrated in FIG. 2F, an etching protection film was formed on the ejection-orifice-forming member 7. Specifically, a solution in which the etching protection film material was dissolved in the application solvent was dropped on the ejection-orifice-forming member 7, and thereafter applied by a spin coating method at 500 rpm for 30 sec. This was baked at 40° C. for 10 min, and further at 140° C. for 5 min to thereby form an etching protection film 8 of 30 μm in thickness.

Then, an etching mask 9 was formed and a supply port 10 was formed, as in Example 1. Then, the surface of the etching protection film 8 was irradiated with Deep-UV at 8 J/cm$^2$. Then, the surface of the etching protection film 8 was immersed in methyl isoamyl ketone followed by a shower of methyl isoamyl ketone to thereby remove the etching protection film 8. In the present Example, the irradiation of Deep-UV improved the removability of the etching protection film 8, and could more reduce the removal steps using methyl isoamyl ketone than in Example 1. Thereafter, by carrying out the same steps as in Example 1, an ink jet recording head was completed. The diameter of the ejection orifices 6 of the ink jet recording head fabricated in the present Example was 15 μm. The evaluation results are shown in Table 1.

Example 3

Preparation of an Etching Protection Film Material

A copolymer of styrene, acrylonitrile and MIPK was used as an etching protection film material. The monomer composition ratio (molar ratio) of styrene, acrylonitrile and MIPK was 5:3:2, and the mass-average molecular weight (Mw) of the copolymer was 150,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 500 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $1.5\times10^6$ Pa.

Fabrication of an Ink Jet Recording Head

An ink jet recording head was fabricated as in Example 2, except for using the above etching protection film material as an etching protection film material, and changing the irradiation amount of Deep-UV to 10 J/cm$^2$. The evaluation results are shown in Table 1.

Example 4

Preparation of an Etching Protection Film Material

A copolymer of styrene, acrylonitrile and methyl methacrylate (MMA) was used as an etching protection film material. The monomer composition ratio (molar ratio) of styrene, acrylonitrile and MMA was 13:6:1, and the mass-average molecular weight (Mw) of the copolymer was 150,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 500 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $2.0\times10^6$ Pa.

Fabrication of an Ink Jet Recording Head

An ink jet recording head was fabricated as in Example 2, except for using the above etching protection film material as an etching protection film material, and changing the irradiation amount of Deep-UV to 10 J/cm$^2$. The evaluation results are shown in Table 1.

Example 5

Preparation of an Etching Protection Film Material

A copolymer of styrene, acrylonitrile and MMA was used as an etching protection film material. The monomer composition ratio (molar ratio) of styrene, acrylonitrile and MMA was 2:1:1, and the mass-average molecular weight (Mw) of the copolymer was 150,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 500 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $2.0\times10^6$ Pa.

Fabrication of an Ink Jet Recording Head

An ink jet recording head was fabricated as in Example 2, except for using the above etching protection film material as an etching protection film material, and changing the irradiation amount of Deep-UV to 10 J/cm$^2$. The evaluation results are shown in Table 1.

Example 6

Preparation of an Etching Protection Film Material

A copolymer of styrene and acrylonitrile was used as an etching protection film material. The monomer composition ratio (molar ratio) of styrene and acrylonitrile was 8:2, and the mass-average molecular weight (Mw) of the copolymer was 120,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 450 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $3.5\times10^6$ Pa.

Fabrication of an Ink Jet Recording Head

An ink jet recording head was fabricated as in Example 1, except for using the above etching protection film material as an etching protection film material. The evaluation results are shown in Table 1.

Example 7

Preparation of an Etching Protection Film Material

A polymer of styrene was used as an etching protection film material. The mass-average molecular weight (Mw) of the polymer was 120,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 450 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $4.0\times10^6$ Pa.

Fabrication of an Ink Jet Recording Head

An ink jet recording head was fabricated as in Example 1, except for using the above etching protection film material as an etching protection film material. The evaluation results are shown in Table 1.

Example 8

Preparation of an Etching Protection Film Material

A copolymer of styrene and acrylonitrile was used as an etching protection film material. The monomer composition ratio (molar ratio) of styrene and acrylonitrile was 5:5, and the mass-average molecular weight (Mw) of the copolymer was 120,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 450 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $2.0\times10^6$ Pa.

Fabrication of an Ink Jet Recording Head

An ink jet recording head was fabricated as in Example 1, except for using the above etching protection film material as an etching protection film material. The evaluation results are shown in Table 1.

Example 9

Preparation of an Etching Protection Film Material

A copolymer of styrene and acrylonitrile was used as an etching protection film material. The monomer composition ratio (molar ratio) of styrene and acrylonitrile was 4:6, and the mass-average molecular weight (Mw) of the copolymer was 120,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 450 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $1.5\times10^6$ Pa.

Fabrication of an Ink Jet Recording Head

An ink jet recording head was fabricated as in Example 1, except for using the above etching protection film material as an etching protection film material. The evaluation results are shown in Table 1.

Example 10

Preparation of an Etching Protection Film Material

A copolymer of styrene and acrylonitrile was used as an etching protection film material. The monomer composition ratio (molar ratio) of styrene and acrylonitrile was 5:2, and the mass-average molecular weight (Mw) of the copolymer was 30,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 350 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $1.0\times10^6$ Pa.

Fabrication of an Ink Jet Recording Head

The above etching protection film material was used as an etching protection film material, and the condition of the spin coating method when the solution in which the etching protection film material was dissolved in the application solvent was applied was changed to at 350 rpm for 30 sec. As in Example 1 except for these conditions, an ink jet recording head was fabricated. The evaluation results are shown in Table 1.

Example 11

Preparation of an Etching Protection Film Material

A copolymer of styrene and acrylonitrile was used as an etching protection film material. The monomer composition ratio (molar ratio) of styrene and acrylonitrile was 5:2, and the mass-average molecular weight (Mw) of the copolymer was 500,000. The application solvent used was the same as in Example 1. A solution in which the etching protection film material was dissolved in the application solvent was prepared. The solid content concentration of the solution was made to be 10% by mass. The solution was dropped on an 8-inch wafer, and thereafter applied by a spin coating method at 200 rpm for 30 sec. This was baked at 40° C. for 10 min, and further at 140° C. for 10 min to thereby fabricate a film of 30 μm in thickness. The storage modulus at 80° C. of this film was measured as in Example 1, and was found to be $4.0\times10^6$ Pa.

Fabrication of an Ink Jet Recording Head

The formation of the etching protection film 8 was carried out by the following process. The solution in which the etching protection film material was dissolved in the application solvent was dropped on the ejection-orifice-forming member 7, and thereafter applied by a spin coating method at 200 rpm for 30 sec. This was baked at 40° C. for 10 min, and further at 140° C. for 10 min to thereby fabricate the etching protection film 8 of 30 μm in thickness. The removal of the etching protection film 8 was carried out by repeating 10 times the process of immersing the surface of the etching protection film 8 in methyl isoamyl ketone followed by a shower of methyl isoamyl ketone. As in Example 1 except for these conditions, an ink jet recording head was fabricated. The evaluation results are shown in Table 1.

Example 12

Preparation of an Etching Protection Film Material

An etching protection film material and an application solvent used were the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 1,700 rpm for 30 sec. This was baked at 40° C. for 10 min, and further at 140° C. for 5 min to thereby fabricate a film of 10 μm in thickness. The storage modulus at 80° C. of this film was measured as in Example 1, and was found to be $3.0\times10^6$ Pa.

Fabrication of an Ink Jet Recording Head

The condition of the spin coating method when the solution in which the etching protection film material was dissolved in the application solvent was applied was changed to at 1,700 rpm for 30 sec; the thickness of the etching protection film was changed to 10 μm; and the diameter of the ejection orifices was changed to 10 μm. As in Example 1 except for these conditions, an ink jet recording head was fabricated. The evaluation results are shown in Table 1.

Example 13

Preparation of an Etching Protection Film Material

An etching protection film material and an application solvent used were the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 2,400 rpm for 30 sec. This was baked at 40° C. for 10 min, and further at 140° C. for 5 min to thereby fabricate a film of 7 μm in thickness. The storage modulus at 80° C. of this film was measured as in Example 1, and was found to be $3.0\times10^6$ Pa.

Fabrication of an Ink Jet Recording Head

The condition of the spin coating method when the solution in which the etching protection film material was dissolved in the application solvent was applied was changed to at 2,400 rpm for 30 sec; and the thickness of the etching protection film was changed to 7 μm. As in Example 1 except for these conditions, an ink jet recording head was fabricated. The evaluation results are shown in Table 1.

Example 14

Preparation of an Etching Protection Film Material

An etching protection film material and an application solvent used were the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 150 rpm for 30 sec. This was baked at 40° C. for 10 min, and further at 140° C. for 10 min to thereby fabricate a film of 100 μm in thickness. The storage modulus at 80° C. of this film was measured as in Example 1, and was found to be $3.0\times10^6$ Pa.

Fabrication of an Ink Jet Recording Head

The formation of an etching protection film 8 was carried out by the following process. A solution in which the etching protection film material was dissolved in the application solvent was dropped on the ejection-orifice-forming member 7, and thereafter applied by a spin coating method at 150 rpm for 30 sec. This was baked at 40° C. for 10 min, and further at 140° C. for 10 min to thereby fabricate the etching protection film 8 of 100 μm in thickness. The removal of the etching protection film 8 was carried out by repeating 10 times the process of immersing the surface of the etching protection film 8 in methyl isoamyl ketone followed by a shower of methyl isoamyl ketone. As in Example 1 except for these conditions, an ink jet recording head was fabricated. The evaluation results are shown in Table 1.

Comparative Example 1

Preparation of an Etching Protection Film Material

A copolymer of styrene and acrylonitrile was used as an etching protection film material. The monomer composition ratio (molar ratio) of styrene and acrylonitrile was 5:3, and the mass-average molecular weight (Mw) of the copolymer was 20,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 300 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $8.0\times10^5$ Pa.

Fabrication of an Ink Jet Recording Head

The above etching protection film material was used as an etching protection film material, and the condition of the spin coating method when the solution in which the etching protection film material was dissolved in the application solvent was applied was changed to at 300 rpm for 30 sec. As in Example 1 except for these conditions, an ink jet recording head was fabricated. The evaluation results are shown in Table 1. Here, pin holes were generated in two silicon substrates out of the 100 silicon substrates, and the ink jet recording heads fabricated using the two silicon substrates generated dot misalignment in ink ejection.

Comparative Example 2

Preparation of an Etching Protection Film Material

A cyclized isoprene having a degree of cyclization of 1 to 2 and having a mass-average molecular weight of 150,000 was used as an etching protection film material. Xylene was used as an application solvent. A solution in which the etching protection film material was dissolved in the application solvent was prepared. The solid content concentration of the solution was made to be 20% by mass. The solution was dropped on an 8-inch wafer, and thereafter applied by a spin coating method at 300 rpm for 30 sec. This was baked at 120° C. for 15 min to thereby fabricate a film of 30 μm in thickness. The storage modulus at 80° C. of this film was measured as in Example 1, and was found to be $3.0\times10^5$ Pa.

Fabrication of an Ink Jet Recording Head

The condition of the spin coating method when the above etching protection film material and the above application solvent were used and the solution in which the etching protection film material was dissolved in the application solvent was applied was changed to at 300 rpm for 30 sec. The baking condition was changed to at 120° C. for 15 min; and the thickness of the etching protection film was changed to 30 μm. As in Example 1 except for these conditions, an ink jet recording head was fabricated. The evaluation results are shown in Table 1. Here, pin holes were generated in one silicon substrate out of the 100 silicon substrates, and the ink jet recording head fabricated using the one silicon substrate generated dot misalignment in ink ejections.

Comparative Example 3

Preparation of an Etching Protection Film Material

A copolymer of styrene and MMA was used as an etching protection film material. The monomer composition ratio (molar ratio) of styrene and acrylic acid was 2:8, and the mass-average molecular weight (Mw) of the copolymer was 120,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 400 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $6.0\times10^5$ Pa.

Fabrication of an Ink Jet Recording Head

An ink jet recording head was fabricated as in Example 2, except for changing the condition of the spin coating method when the above etching protection film material and the above application solvent were used and the solution in which the etching protection film material was dissolved in the application solvent was applied, to at 400 rpm for 30 sec. The evaluation results are shown in Table 1. Here, pin holes were generated in two silicon substrates out of the 100 silicon substrates, and the ink jet recording heads fabricated using the two silicon substrates generated dot misalignment in ink ejection.

Comparative Example 4

Preparation of an Etching Protection Film Material

A copolymer of styrene, acrylonitrile and MMA was used as an etching protection film material. The monomer composition ratio (molar ratio) of styrene, acrylonitrile and MMA was 1:3:3, and the mass-average molecular weight (Mw) of the copolymer was 100,000. The application solvent used was the same as in Example 1. A solution in which the etching protection film material was dissolved in the application solvent was prepared. The solid content concentration of the solution was made to be 20% by mass. The solution was dropped on an 8-inch wafer, and thereafter applied by a spin coating method at 400 rpm for 30 sec. This was baked at 40° C. for 10 min, and further at 140° C. for 5 min to thereby fabricate a film of 30 μm in thickness. The storage modulus at 80° C. of this film was measured as in Example 1, and was found to be $5.0\times10^5$ Pa.

Fabrication of an Ink Jet Recording Head

An ink jet recording head was fabricated as in Example 2, except for changing the condition of the spin coating method when the above etching protection film material and the above application solvent were used and the solution in which the etching protection film material was dissolved in the application solvent was applied, to at 400 rpm for 30 sec. The evaluation results are shown in Table 1. Here, pin holes were generated in two silicon substrates out of the 100 silicon substrates, and the ink jet recording heads fabricated using the two silicon substrates generated dot misalignment in ink ejection.

TABLE 1

| | Condition | | | | | | | Evaluation | | |
|---|---|---|---|---|---|---|---|---|---|---|
| | (Co)polymer | | | Storage | Protection Film | Ejection Orifice | Light Irradiation | | | |
| | Monomer Composition Ratio | Styrene Proportion/% | Mw | Modulus/Pa | Thickness/μm | Diameter/μm | In Removal Process | Removability | Appearance After Etching | Printing |
| Example 1 | styrene:acrylonitrile = 5:2 | 71.4 | $1.2 \times 10^5$ | $3.0 \times 10^6$ | 30 | 15 | absent | A | A | A |
| Example 2 | styrene:acrylonitrile:MIPK = 13:6:1 | 65.0 | $1.5 \times 10^5$ | $2.0 \times 10^6$ | 30 | 15 | present | AA | A | A |
| Example 3 | styrene:acrylonitrile:MIPK = 5:3:2 | 50.0 | $1.5 \times 10^5$ | $1.5 \times 10^6$ | 30 | 15 | present | AA | A | A |
| Example 4 | styrene:acrylonitrile:MMA = 13:6:1 | 65.0 | $1.5 \times 10^5$ | $2.0 \times 10^6$ | 30 | 15 | present | AA | A | A |
| Example 5 | styrene:acrylonitrile:MMA = 2:1:1 | 50.0 | $1.5 \times 10^5$ | $2.0 \times 10^6$ | 30 | 15 | present | AA | B | A |
| Example 6 | styrene:acrylonitrile = 8:2 | 80.0 | $1.2 \times 10^5$ | $3.5 \times 10^6$ | 30 | 15 | absent | A | A | A |
| Example 7 | styrene | 100.0 | $1.2 \times 10^5$ | $4.0 \times 10^6$ | 30 | 15 | absent | A | B | A |
| Example 8 | styrene:acrylonitrile = 5:5 | 50.0 | $1.2 \times 10^5$ | $2.0 \times 10^6$ | 30 | 15 | absent | A | A | A |
| Example 9 | styrene:acrylonitrile = 4:6 | 40.0 | $1.2 \times 10^5$ | $1.5 \times 10^6$ | 30 | 15 | absent | A | B | A |
| Example 10 | styrene:acrylonitrile = 5:2 | 71.4 | $3.0 \times 10^4$ | $1.0 \times 10^6$ | 30 | 15 | absent | A | B | A |
| Example 11 | styrene:acrylonitrile = 5:2 | 71.4 | $5.0 \times 10^5$ | $4.0 \times 10^6$ | 30 | 15 | absent | B | A | A |
| Example 12 | styrene:acrylonitrile = 5:2 | 71.4 | $1.2 \times 10^5$ | $3.0 \times 10^6$ | 10 | 10 | absent | A | A | A |
| Example 13 | styrene:acrylonitrile = 5:2 | 71.4 | $1.2 \times 10^5$ | $3.0 \times 10^6$ | 7 | 15 | absent | A | B | A |
| Example 14 | styrene:acrylonitrile = 5:2 | 71.4 | $1.2 \times 10^5$ | $3.0 \times 10^6$ | 100 | 15 | absent | B | A | A |
| Comparative Example 1 | styrene:acrylonitrile = 5:3 | 62.5 | $2.0 \times 10^4$ | $8.0 \times 10^5$ | 30 | 15 | absent | A | C | C |
| Comparative Example 2 | cyclized isoprene | 0.0 | $1.5 \times 10^5$ | $3.0 \times 10^5$ | 30 | 15 | absent | A | C | C |
| Comparative Example 3 | styrene:MMA = 2:8 | 20.0 | $1.2 \times 10^5$ | $6.0 \times 10^5$ | 30 | 15 | present | AA | C | C |
| Comparative Example 4 | styrene:acrylonitrile:MMA = 1:3:3 | 14.3 | $1.0 \times 10^5$ | $5.0 \times 10^5$ | 30 | 15 | present | AA | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-181149, filed Sep. 2, 2013, which is hereby incorporated by reference herein in its entirety.

What is claimed is:

1. A process for producing a liquid ejection head including a silicon substrate having a supply port to supply a liquid to a flow path, and an ejection-orifice-forming member forming the flow path between the ejection-orifice-forming member and the silicon substrate and having an ejection orifice to eject the liquid in the flow path, the process comprising:

forming an etching protection film so as to cover the ejection-orifice-forming member;

forming the supply port passing through the silicon substrate by anisotropic etching using an alkaline aqueous solution; and removing the etching protection film, wherein the etching protection film comprises an organic polymer material having a storage modulus at 80° C. of $1.0\times10^6$ Pa or higher.

2. The process for producing a liquid ejection head according to claim 1, wherein the organic polymer material has a storage modulus at 80° C. of $2.0\times10^6$ Pa or higher and $9.0\times10^6$ Pa or lower.

3. The process for producing a liquid ejection head according to claim 1, wherein the organic polymer material has no hydroxyl group.

4. The process for producing a liquid ejection head according to claim 1, wherein the organic polymer material is a copolymer of a monomer mixture comprising styrene and acrylonitrile.

5. The process for producing a liquid ejection head according to claim 4, wherein the monomer mixture further comprises at least one of compounds represented by the following formulae (1) and (2):

(1)

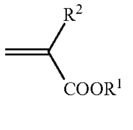

wherein $R^1$ is an alkyl group; and $R^2$ is hydrogen or an alkyl group, and (2)

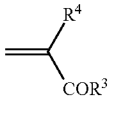

wherein $R^3$ and $R^4$ are each hydrogen or an alkyl group.

6. The process for producing a liquid ejection head according to claim 4, wherein the proportion of a styrene unit in the copolymer is 50 to 80% by mol; and the mass-average molecular weight of the copolymer is 50,000 to 400,000.

7. The process for producing a liquid ejection head according to claim 1, wherein the etching protection film has a thickness equal to or larger than a diameter of the ejection orifice.

8. The process for producing a liquid ejection head according to claim 1, wherein the etching protection film has a thickness of 10 μm or larger and 50 μm or smaller.

9. The process for producing a liquid ejection head according to claim 1, further comprising:

forming a positive resist layer on the silicon substrate;

patterning the positive resist layer to thereby form a mold material of the flow path;

forming a resin layer serving as the ejection-orifice-forming member so as to cover the mold material; and forming the ejection orifice in the resin layer.

10. The process for producing a liquid ejection head according to claim 1, wherein the anisotropic etching is an anisotropic etching using an alkaline aqueous solution at 75 to 90° C.

* * * * *